(12) United States Patent
Rice

(10) Patent No.: US 10,107,418 B2
(45) Date of Patent: Oct. 23, 2018

(54) SUBSEA CLAMP TENSIONING SYSTEM

(71) Applicant: Oceaneering International, Inc., Houston, TX (US)

(72) Inventor: Kenneth Lane Rice, Austin, TX (US)

(73) Assignee: Oceaneering International, Inc., Houston, TX (US)

( * ) Notice: Subject to any disclaimer, the term of this patent is extended or adjusted under 35 U.S.C. 154(b) by 321 days.

(21) Appl. No.: 15/075,140

(22) Filed: Mar. 19, 2016

(65) Prior Publication Data

US 2016/0273677 A1 Sep. 22, 2016

Related U.S. Application Data

(63) Continuation of application No. 62/135,947, filed on Mar. 20, 2015.

(51) Int. Cl.
| | |
|---|---|
| *F16L 1/26* | (2006.01) |
| *B23K 37/053* | (2006.01) |
| *F16J 15/00* | (2006.01) |

(52) U.S. Cl.
CPC ............... *F16L 1/26* (2013.01); *F16J 15/00* (2013.01); *B23K 37/0533* (2013.01)

(58) Field of Classification Search
CPC .............................. F16L 1/26; B23K 37/0533
USPC ............ 29/281.5, 281.6, 237, 252; 405/170; 228/44.5, 49.3; 269/229, 37
See application file for complete search history.

(56) References Cited

U.S. PATENT DOCUMENTS

| | | | | |
|---|---|---|---|---|
| 436,915 | A * | 9/1890 | Fischer | B25B 27/10 29/237 |
| 1,775,311 | A * | 9/1930 | Halle | B23K 5/08 219/60 R |
| 2,054,375 | A * | 9/1936 | Halle | B23K 37/02 228/28 |
| 2,820,379 | A * | 1/1958 | Napierskie | F16L 13/128 29/254 |
| 3,284,883 | A * | 11/1966 | Haverfield | B23K 37/0533 219/60 R |
| 3,407,611 | A * | 10/1968 | Coultrup | B23K 9/0061 405/170 |
| 3,422,519 | A * | 1/1969 | Fehlman | B23K 37/0533 228/44.5 |
| 3,566,505 | A * | 3/1971 | Martin | F16L 1/26 228/49.3 |
| 3,571,896 | A * | 3/1971 | Wilkerson | F16L 1/09 29/237 |
| 3,644,695 | A * | 2/1972 | Shuey, Jr. | B23K 13/00 219/59.1 |
| 3,658,231 | A * | 4/1972 | Gilman | F16L 1/26 228/44.5 |

(Continued)

*Primary Examiner* — Sunil Singh
(74) *Attorney, Agent, or Firm* — Maze IP Law, P.C.

(57) ABSTRACT

The disclosed subsea clamp tensioning system includes predictability of gasket pre-load to input closure and allows a subsea clamp tensioning system to be closed and made-up without the hindrance of frictional loads that will cause a loss of tension in a drive screw. In an embodiment, the subsea clamp tensioning system tensions the drive screw by applying a set torque load into an API class torque bucket which translates into an applied tension at the drive screw. The tension load on the drive screw applies the gasket pre-load required to create a metal-to-metal seal between the two clamp hubs. Once complete and tested, the subsea clamp tensioning system may be removed and mounted onto a connector tool for retrieval to the surface.

13 Claims, 2 Drawing Sheets

(56) References Cited

U.S. PATENT DOCUMENTS

| | | | | |
|---|---|---|---|---|
| 3,668,766 | A | * | 6/1972 | Carter ................. B29C 65/7802 228/44.5 |
| 3,711,920 | A | * | 1/1973 | Simmons, Jr. ..... B23K 37/0533 269/43 |
| 3,717,920 | A | * | 2/1973 | Oliver ....................... F16L 1/26 285/24 |
| 3,718,004 | A | * | 2/1973 | Oliver ....................... F16L 1/26 166/347 |
| 3,750,255 | A | * | 8/1973 | Stanley ................ B23K 9/0286 228/44.3 |
| 3,815,202 | A | * | 6/1974 | Squires ..................... F16L 1/09 29/252 |
| 3,925,854 | A | * | 12/1975 | McFadden ......... B23K 37/0533 219/161 |
| 4,133,557 | A | * | 1/1979 | Ahlstone ................... F16L 1/26 285/146.3 |
| 4,178,668 | A | * | 12/1979 | George ................... B25B 27/02 29/237 |
| 4,413,765 | A | * | 11/1983 | Tracy ................. B23K 37/0533 138/97 |
| 4,579,272 | A | * | 4/1986 | McClure ............ B23K 37/0533 228/49.3 |
| 4,586,647 | A | * | 5/1986 | Dearman .................. F16L 3/20 228/49.3 |
| 4,722,468 | A | * | 2/1988 | McClure ............ B23K 37/0533 228/49.3 |
| 5,052,608 | A | * | 10/1991 | McClure ............ B23K 37/0533 228/44.5 |
| 5,433,482 | A | * | 7/1995 | Baddour ............. E21B 43/0107 285/101 |
| 5,609,291 | A | * | 3/1997 | Hummel ............ B23K 37/0531 219/61.1 |
| 5,640,748 | A | * | 6/1997 | Harrison ................. B25B 27/10 254/29 R |
| 6,227,765 | B1 | * | 5/2001 | von Trepka ............. F16L 1/161 166/343 |
| 2002/0060236 | A1 | * | 5/2002 | Jankus ................ B23B 31/4066 228/44.5 |
| 2006/0201995 | A1 | * | 9/2006 | Gopalan ............ B23K 37/0531 228/44.5 |
| 2015/0165672 | A1 | * | 6/2015 | Montgomery ...... B29C 65/7802 156/272.2 |

\* cited by examiner

SUBSEA CLAMP TENSIONING SYSTEM

RELATION TO PRIOR APPLICATIONS

This application claims the benefit of, and priority through, U.S. Provisional Application 62/135,947, titled "Subsea Clamp Tensioning System," filed Mar. 20, 2015.

BACKGROUND

Tensioner system are known in the art but hazards of using them include a buildup of unpredictably frictional loads created by thread and sliding frictions in the torqueing process. Standard torque systems lack predictability of gasket pre-load to input closure (tensioning and torqueing).

FIGURES

Various figures are included herein which illustrate aspects of embodiments of the disclosed invention.

DESCRIPTION OF EXEMPLARY EMBODIMENTS

Figure 1:
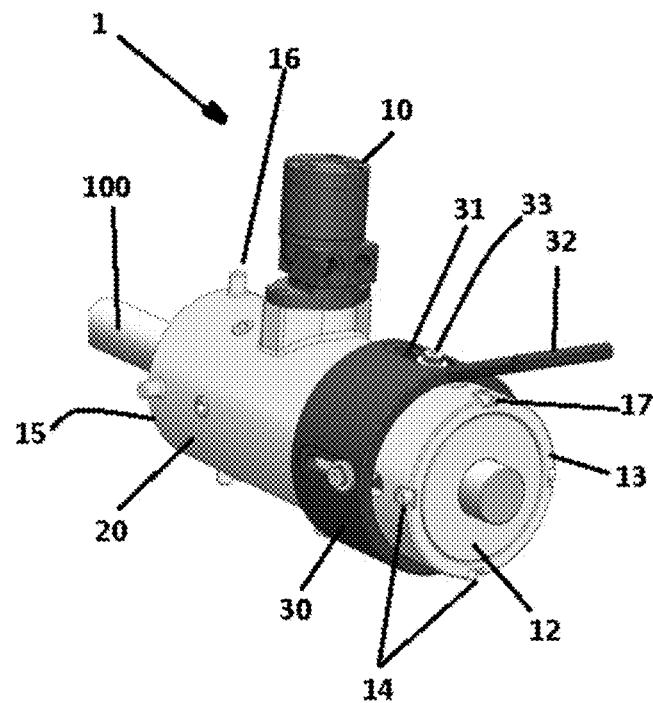
FIG. 1 is a view in partial perspective of an exemplary subsea clamp tensioning system disposed about a tubular.
Figure 2:
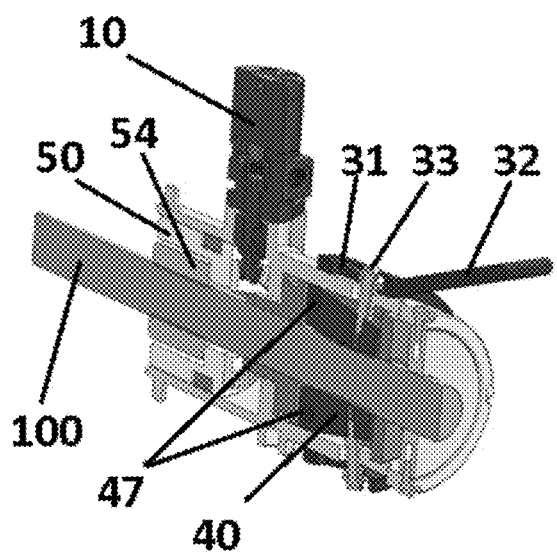
FIG. 2 is a cut-away view in partial perspective of an exemplary subsea clamp tensioning system disposed about a tubular.
Figure 3:
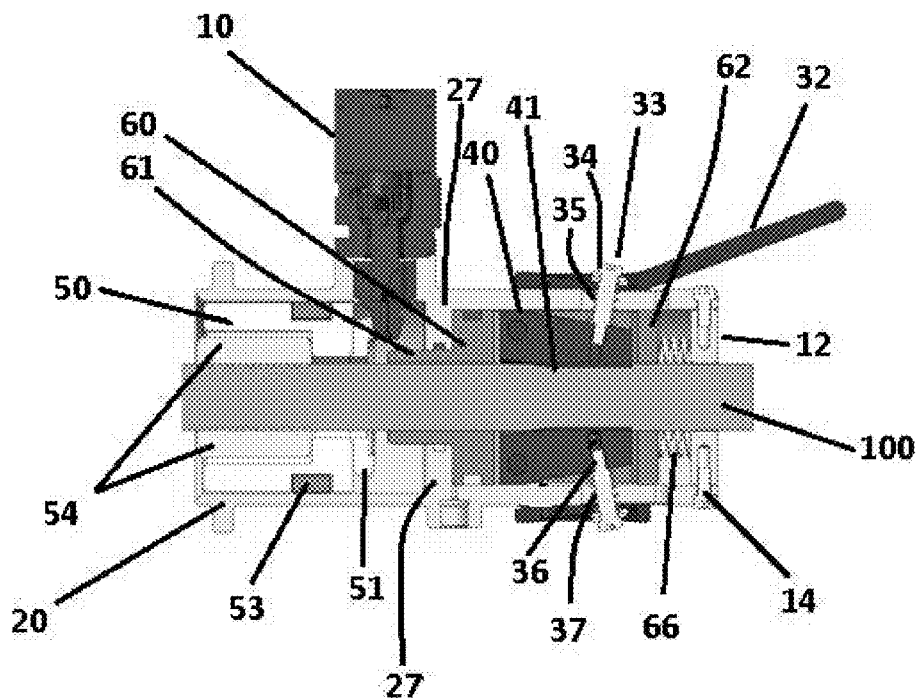
FIG. 3 is a cut-away side view in partial perspective of an exemplary subsea clamp tensioning system disposed about a tubular.

Referring to FIGS. 1 and 3, generally, as discussed below, there are two hubs (not shown in the figures), one on a side of subsea clamp tensioning system 1 towards an outboard device such as a tree, manifold, or PLET, and one on a connector. Subsea clamp tensioning system 1 holds the two hubs together, typically with a metal seal installed between them to prevent leakage. The hubs typically have multiple features for sealing, alignment, and interaction with subsea clamp tensioning system 1. As illustrated in the figures, a portion of tubular 100 may be threaded.

Subsea clamp tensioning system 1 comprises housing 20; collar 30 dimensioned to fit about housing 20, where collar 30 comprises a plurality of offset channels 31; a set of adjusters 33 (FIG. 3) corresponding to the plurality of offset channels 31; collar handle 32; a plurality of tension grips 40 (FIG. 3) movingly disposed within interior void 21 (FIG. 4), the plurality of tension grips 40 defining a tension grip channel 41 (FIG. 3); subsea hydraulic motor 10; and nut runner 50 (FIG. 3) disposed within a portion of interior void 21 and dimensioned to accept and engage tubular 100, where nut runner 50 is operatively in communication with subsea hydraulic motor 10 and dimensioned to accept tubular 100 therethrough. Typically, there is one adjuster 33 and one offset channel 31 for each tension grip 40.

Housing 20 typically comprises interior void 21 (FIG. 4) dimensioned to accept tubular 100 therethrough, first end 15, and second end 13 disposed opposite first end 15. One or more receivers 17 may be present at either first end 15 or second end 13, each receiver 17 dimensioned to receive a corresponding guide 16 and/or fastener 14.

Figure 4:
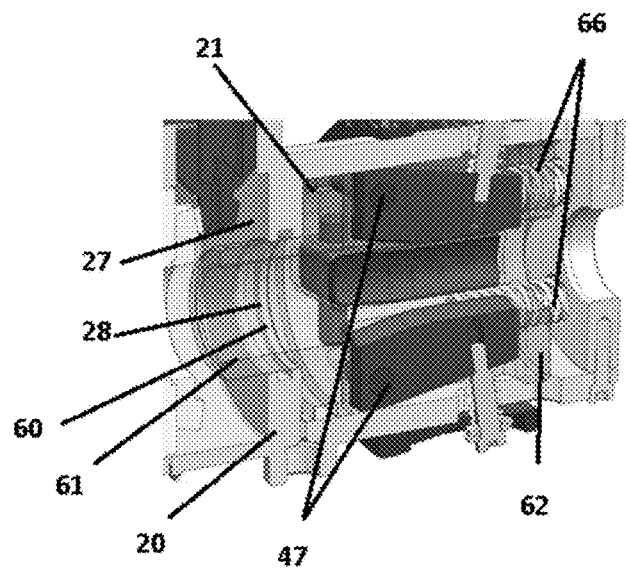
FIG. 4 is a cut-away view in partial perspective of an exemplary subsea clamp tensioning system illustrating an embodiment of tension grips disposed within a tension grip holder.

Tension grip stop 12 may be disposed proximate second housing end 13 and may further be disposed at least partially within interior void 21 (FIG. 4). In most embodiments, tension grip stop 12 comprises a port dimensioned to allow a portion of tubular 100 to go through tension grip stop 12.

Referring more to FIG. 3, each adjuster 33 typically comprises upper portion 34 configured to be larger in a dimension than its corresponding offset channel 31 (FIG. 1) such that offset channel 31 prohibits travel of upper portion 34 into interior void 21 (FIG. 4). Each adjuster 33 further typically comprises middle portion 35 connected to upper portion 34 which is dimensioned to travel into interior void 21 and lower portion 36 connected to middle portion 34, where lower portion 36 is engagable with its associated tension grip 40. Each adjuster also typically comprises one or more springs 37 disposed about a predetermined length of middle portion 35. In most embodiments, upper portion 34, middle portion 35, and lower portion 36 are contiguous.

Although tension grip 40 may comprise any appropriate shape, it typically comprises a substantially trapezoidally shaped tension grip.

Nut runner 50 may further comprise one or more gears 51, typically a bevel gear, which is operatively in communication with subsea hydraulic motor 10. Nut runner 50 typically comprises nut 54, operatively connected to subsea hydraulic motor 10, and preferably further comprises grooves dimensioned to cooperatively engage with corresponding threads in tubular 100. Nut 54 is typically rotationally disposed within nut runner 50.

One or more seals 53 may disposed within housing interior void 21 and be operatively in occlusive communication with nut runner 50.

In contemplated embodiments, referring additionally to FIG. 4, tension grip housing 60 (FIG. 3) is disposed at least partially within interior void 21 and each tension grip 40 movingly, e.g. pivotally at pivot 47, disposed within tension grip housing 60 at an end of tension grip 40 closest to first end 15. In these embodiments, interior void 21 may further comprise housing wall 27 disposed intermediate first end 15 and second end 13, where housing wall 27 comprises housing wall port 28 sufficiently sized to accept tubular 100 (FIG. 1) therethrough. Tension grip housing 60 may then comprise first end 61 dimensioned to partially fit through housing wall port 28; second end 62 disposed opposite first end 61, where second end 62 defines a tension grip housing stop; and one or more stop springs 66 disposed between tension grip stop 12 and second end 62.

In the operation of an exemplary method, subsea clamp tensioning system 1 is positioned about tubular 100, where subsea clamp tensioning system 1 is as described above. Using the set of adjusters 33 (FIG. 3), the plurality of tension grips 40 may be advanced against tubular 100 by pulling each of the adjusters 33 as opposed to turning them to create a desired tension.

A nut spinning function of subsea clamp tensioning system 1 may be automated by having collar handle 32 utilize subsea hydraulic motor 10 to draw two clamp sections together around the hubs (not shown in the figures) after a set of connection tools (not shown in the figures) have brought the hubs face-to-face. The two subsea clamp tensioning systems 1 may be aligned during this process using receivers 17 and corresponding guides 16 and their opposing ends secured using tension grip stops 12.

As subsea clamp tensioning system 1 is activated, nut runner 50 is allowed to continue to spin nut 54 to mechanically lock subsea clamp tensioning system 1 such as by engaging and advancing threads on tubular 100. Typically, final clamp tension is created by making up tension via the built-in hydraulic piston load to create the desired gasket pre-load.

Further, collar handle 32 is typically allowed to snug adjusters 33 as subsea clamp tensioning system 1 is activated, e.g. by using adjusters 33 to advance one or more tension grips 40 against tubular 100.

Once the operation is completed and tested, subsea clamp tensioning system 1 may be removed. It may also then be mounted onto a connector tool for retrieval to the surface.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A subsea clamp tensioning system, comprising:
    a. a housing, comprising:
        i. an interior void dimensioned to accept a tubular therethrough;
        ii. a first end; and
        iii. a second end disposed opposite the first end;
    b. a collar dimensioned to fit about the housing, the collar comprising a plurality of offset channels;
    c. a plurality of tension grips movingly disposed within the interior void, the tension grips defining a tension grip channel, each tension grip defining a portion of the tension grip channel;
    d. a set of adjusters corresponding to the plurality of offset channels, each adjuster comprising:
        i. an upper portion configured to be larger in a dimension than the offset channel such that the offset channel prohibits travel of the upper portion into the interior void;
        ii. a middle portion connected to the upper portion and dimensioned to travel through the offset channel into the interior void;
        iii. a lower portion connected to the middle portion, the lower portion engagable with the tension grip; and
        iv. a spring disposed about a predetermined length of the middle portion;
    e. a subsea hydraulic motor; and
    f. a nut runner disposed within a portion of the interior void and dimensioned to accept and engage the tubular, the nut runner operatively in communication with the subsea hydraulic motor, the nut runner dimensioned to accept the tubular therethrough.

2. The subsea clamp tensioning system of claim 1, further comprising a tension grip stop disposed proximate the second housing end.

3. The subsea clamp tensioning system of claim 2, wherein the tension grip stop is disposed at least partially within the interior void.

4. The subsea clamp tensioning system of claim 1, wherein each tension grip further comprises a substantially trapezoidally shaped tension grip.

5. The subsea clamp tensioning system of claim 1, wherein each of the plurality of offset channels is associated with a tension grip of the plurality of tension grips.

6. The subsea clamp tensioning system of claim 1, further comprising a tension grip housing disposed at least partially within the interior void, each tension grip pivotally mounted within the tension grip housing at an end of the tension grip closest to the first end of the housing.

7. The subsea clamp tensioning system of claim 6, wherein:
    a. the interior void further comprises a housing wall disposed intermediate the first end and the second end, the housing wall comprising a housing wall port; and
    b. the tension grip housing further comprises:
        i. a first end dimensioned to partially fit through the housing wall port;
        ii. a second end disposed opposite the first end, the second end defining a tension grip housing stop; and
        iii. a stop spring disposed between the tension grip stop and the tension grip housing stop.

8. The subsea clamp tensioning system of claim 7, wherein the nut runner further comprises a gear operatively in communication with the subsea hydraulic motor.

9. The subsea clamp tensioning system of claim 8, wherein the gear further comprises a bevel gear.

10. The subsea clamp tensioning system of claim 8, further comprising a seal disposed within the housing interior void and operatively in occlusive communication with the nut runner.

11. The subsea clamp tensioning system of claim 1, wherein the nut runner further comprises a nut operatively connected to the subsea hydraulic motor.

12. The subsea clamp tensioning system of claim 11, wherein the nut further comprises a groove dimensioned to cooperatively engage with corresponding threads in the tubular.

13. The subsea clamp tensioning system of claim 11, wherein the nut is rotationally disposed within the nut runner.

* * * * *